US006780320B2

(12) United States Patent
Lee et al.

(10) Patent No.: US 6,780,320 B2
(45) Date of Patent: Aug. 24, 2004

(54) MAGNETOHYDRODYNAMIC FLUIDIC SYSTEM

(75) Inventors: Abraham P. Lee, Irvine, CA (US); Mark G. Bachman, Irvine, CA (US)

(73) Assignee: The Regents of the University of California, Oakland, CA (US)

(*) Notice: Subject to any disclaimer, the term of this patent is extended or adjusted under 35 U.S.C. 154(b) by 135 days.

(21) Appl. No.: 10/177,332

(22) Filed: Jun. 20, 2002

(65) Prior Publication Data

US 2003/0234220 A1 Dec. 25, 2003

(51) Int. Cl.[7] .................................................. B01D 11/00

(52) U.S. Cl. ......................... 210/634; 210/511; 422/69; 422/129; 417/48; 417/50; 435/4; 435/287.3; 436/180

(58) Field of Search ................................. 210/511, 634; 422/63, 68.1, 69, 100, 102, 129; 436/53, 180; 417/48, 50, 53; 204/450, 451, 453, 600, 601, 604; 435/4, 5, 6, 286.5, 286.7, 287.1–287.4

(56) References Cited

U.S. PATENT DOCUMENTS

| | | | | |
|---|---|---|---|---|
| 4,818,185 A | | 4/1989 | Alexeff | |
| 4,906,877 A | | 3/1990 | Ciaio | |
| 5,181,016 A | | 1/1993 | Lee | |
| 5,560,543 A | | 10/1996 | Smith et al. | |
| 5,669,433 A | | 9/1997 | Sterett et al. | |
| 5,795,457 A | | 8/1998 | Pethig et al. | |
| 5,810,988 A | | 9/1998 | Smith, Jr. et al. | |
| 5,846,396 A | * | 12/1998 | Zanzucchi et al. | 204/601 |
| 5,876,187 A | | 3/1999 | Forster et al. | |
| 5,876,615 A | | 3/1999 | Predetechensky | |
| 5,925,324 A | | 7/1999 | Greer | |
| 6,146,103 A | | 11/2000 | Lee et al. | |
| 6,154,226 A | | 11/2000 | York et al. | |
| 6,197,595 B1 | * | 3/2001 | Anderson et al. | 436/180 |
| 6,284,113 B1 | * | 9/2001 | Bjornson et al. | 204/453 |
| 6,576,459 B2 | * | 6/2003 | Miles et al. | 435/286.5 |

FOREIGN PATENT DOCUMENTS

| | | |
|---|---|---|
| WO | WO 96/15576 | 5/1996 |
| WO | WO 96/42004 | 12/1996 |
| WO | WO 97/25152 | 7/1997 |
| WO | WO 98/14272 | 4/1998 |

OTHER PUBLICATIONS

Lemoff, A., et al., "An AC magnetohydrodynamic micropump," Sensors and Actuators B Chemical B 63, (2000), pp. 178–185, Elsevier Science S.A..

Lemoff, A, "Field Driven Microfluidic Actuators for Micro Total Analysis Systems: Magnetohydrodynamic Micropump and Microfluidic Switch, Electrostatic DNA Extractor, Dielectrophoretic DNA Sorter," Dissertation for Doctor of Philosophy in Engineering: Applied Science in the Office in Graduate Studies of the Univ. of California, Davis, (2000), 97 pages.

Morris, C., et al., "Optimization of a circular piezoelectric bimorph for a micropump driver," J. Micromech. Microeng. 10, (2000), pp. 459–465, IOP Publishing Ltd.

TSAI, Jr–Hung et al., "A Thermal Bubble Actuated Micro Nozzle–Diffluser Pump," IEEE, (2001), pp. 409–412.

Stemme, E., et al., "A valveless diffuser/nozzle–based fluid pump," Sensors and Actuators A, 39, (1993), Elsevier Sequoia, pp. 159–167.

* cited by examiner

*Primary Examiner*—Joseph Drodge
(74) *Attorney, Agent, or Firm*—Eddie E. Scott; Alan H. Thompson

(57) ABSTRACT

A magnetohydrodynamic fluidic system includes a reagent source containing a reagent fluid and a sample source containing a sample fluid that includes a constituent. A reactor is operatively connected to the supply reagent source and the sample source. MHD pumps utilize a magnetohydrodynamic drive to move the reagent fluid and the sample fluid in a flow such that the reagent fluid and the sample fluid form an interface causing the constituent to be separated from the sample fluid.

42 Claims, 5 Drawing Sheets

MAGNETOHYDRODYNAMIC FLUIDIC SYSTEM

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to fluidics and more particularly to a magnetohydrodynamic fluidic system.

2. State of Technology

Background information on microfluidics is contained in U.S. Pat. No. 5,876,187 for micropumps with fixed valves to Fred K. Forster et al., patented Mar. 2, 1999 including the following: "Miniature pumps, hereafter referred to as micropumps, can be constructed using fabrication techniques adapted from those applied to integrated circuits. Such fabrication techniques are often referred to as micromachining. Micropumps are in great demand for environmental, biomedical, medical, biotechnical, printing, analytical instrumentation, and miniature cooling applications."

Background information on magnetohydrodynamics is contained in U.S. Pat. No. 6,146,103 for micromachined magnetohydrodynamic actuators and sensors to Abraham P. Lee and Asuncion V. Lemoff, patented Nov. 14, 2000 including the following: "Microfluidics is the field for manipulating fluid samples and reagents in minute quantities, such as in micromachined channels, to enable hand-held bioinstrumentation and diagnostic tools with quicker process speeds. The ultimate goal is to integrate pumping, valving, mixing, reaction, and detection on a chip for biotechnological, chemical, environmental, and health care applications. Most micropumps developed thus far have been complicated, both in fabrication and design, and often are difficult to reduce in size, negating many integrated fluidic applications. Most pumps have a moving component to indirectly pump the fluid, generating pulsatile flow instead of continuous flow. With moving parts involved, dead volume is often a serious problem, causing cross-contamination in biological sensitive processes. The present invention utilizes MHDs for microfluid propulsion and fluid sensing, the microfabrication methods for such a pump, and the integration of multiple pumps for a microfluidic system. MHDs is the application of Lorentz force law on fluids to propel or pump fluids. Under the Lorentz force law, charged particles moving in a uniform magnetic field feel a force perpendicular to both the motion and the magnetic field. It has thus been recognized that in the microscale, the MHD forces are substantial for propulsion of fluids through microchannels as actuators, such as a micropump, micromixer, or microvalve, or as sensors, such as a microflow meter, or viscosity meter. This advantageous scaling phenomenon also lends itself to micromachining by integrating microchannels with micro-electrodes." The disclosure of U.S. Pat. No. 6,146,103 is incorporated herein by reference.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a magnetohydrodynamic fluidic system. A reagent source contains a supply of reagent fluid used in the system. A sample source contains a sample fluid that includes a constituent. The supply source and the sample source operatively merge into a reactor microchannel. MHD pumps move the reagent fluid and the sample fluid into the reactor. The MHD pumps move the fluid and the sample fluid in a manner such that an interface is formed between the fluid and the sample fluid. This causes the constituent to be separated from the sample fluid.

In one embodiment the magnetohydrodynamic fluidic system is an extractor of high diffusion coefficient molecules. The system includes a first sheath reservoir containing a first sheath fluid and a second sheath reservoir containing a second sheath fluid. A sample reservoir contains a sample fluid consisting of a mixture of large and small molecules. The system includes an extraction section that extracts faster diffusing small molecules to one of the sheath fluids. When pumped through the extraction section, the sample is sandwiched by sheath flow from the sheath reservoirs. As a result, the faster diffusing small molecules are extracted to the sheath flow in the extraction section and delivered to an extraction reservoir. The rest of the sample can be delivered to waste or to other sections for disposal or further processing.

In another embodiment of magnetohydrodynamic microfluidics a molecular loader system is provided. The system delivers small molecules to cells or proteins. The system loads cells or proteins with small molecules or nucleic acids. A first sheath delivery reservoir contains a first sheath fluid and second sheath delivery reservoir contains a second sheath fluid. A host reservoir contains a host fluid consisting of host cells or molecules. The first sheath delivery reservoir, the second sheath delivery reservoir, and the host reservoir all merge into a loading section through microchannels. This loading section then separates into a first waste reservoir, a second waste reservoir and a product reservoir. MHD pumps move the sheath fluids and the host fluids. A host fluid including the host cells or molecules is stored in the host reservoir. When pumped through the loading section the host fluid is sandwiched by sheath flow from the sheath delivery reservoirs. As a result, the fast diffusing small delivery molecules will diffuse to the product stream in the loading section and be delivered to the product reservoir. The rest of the sheath delivery fluid is delivered to the waste or to other sections for disposal or further processing. The diffusion lengths are adjusted by tuning the MHD pumps to modify the pressure ratios between the host flow and the sheath flows. This in turn sets the diffusion threshold of what size molecules to load into the host fluid.

In another embodiment of magnetohydrodynamic microfluidics a bioaccelerator reactor system is provided. The bioaccelerator reactor system includes a first loop and a second loop. MHD accelerators in the first loop and the second loop move a sample and a reagent through the first loop and the second loop. An interface is provided between the first loop and the second loop. The MHD accelerators in the first loop and the second loop move adjust the rate the sample and reagent flow at the interface. As the sample is delivered from the sample reservoir to the upper loop, it is accelerated by the sample MHD accelerator. Similarly, the reagent is delivered from the reagent reservoir to the lower loop and accelerated by the reagent MHD accelerator. The upper loop and lower loop are prevented from exiting to the collection chamber or the waste chamber by a counter pressures generated by restrictor MHD pumps. The sample and reagent merge only at the fluid interface with a predetermined reaction length. As soon as the desired reaction time is reached or a product is detected, the restrictor MHD pumps are reversed to collect the product into the collection chamber and the used reagents into the waste chamber.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
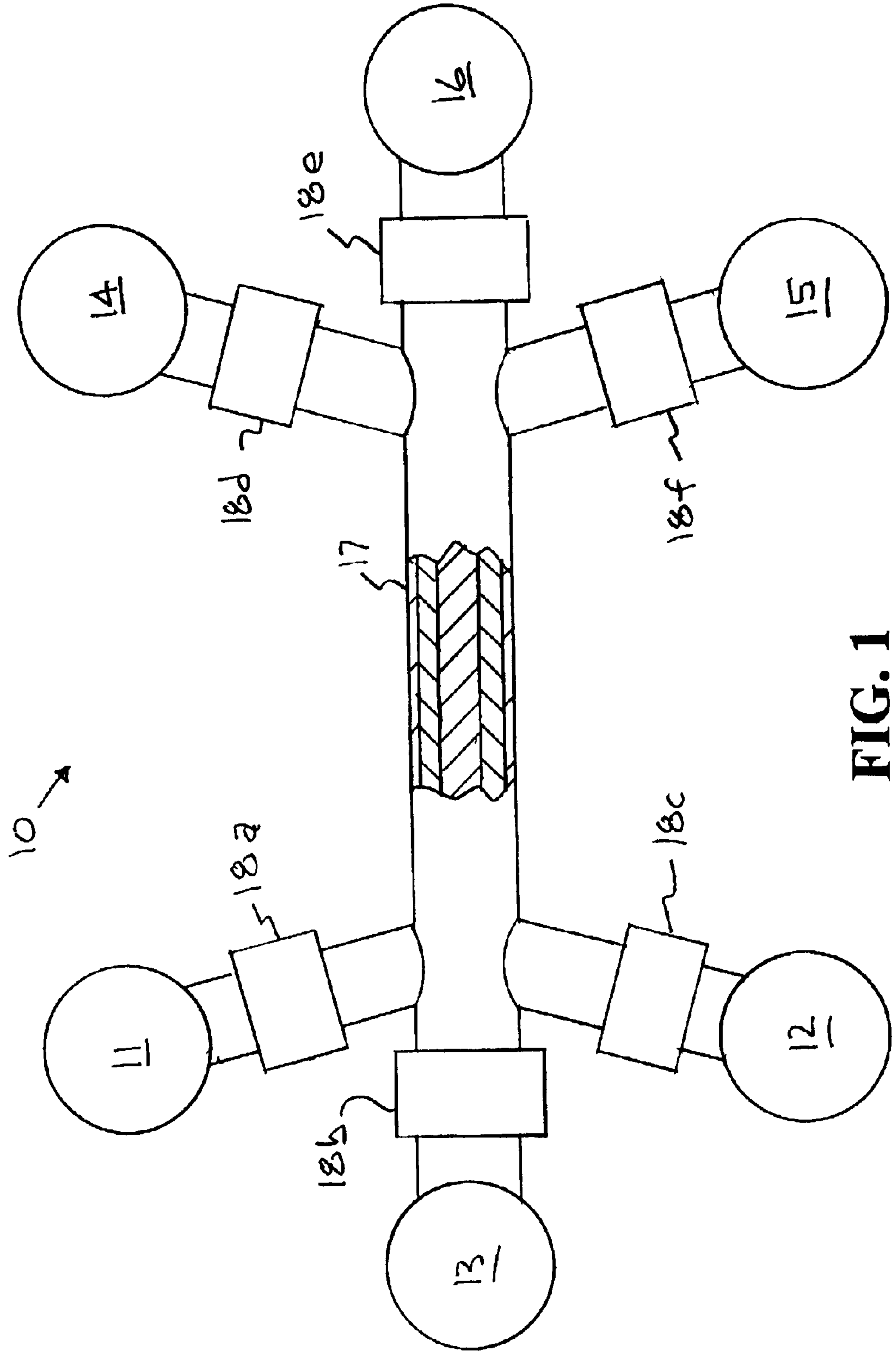
FIG. 1 illustrates an embodiment of a magnetohydrodynamic fluidic system constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to the drawings, and in particular to FIG. 1, a magnetohydrodynamic fluidic system is illustrated. The system is designated generally by the reference numeral 10. The system 10 has use as a magnetohydrodynamic diffusion extractor, a magnetohydrodynamic diffusion loader, a magnetohydrodynamic diffusion reactor, and other magnetohydrodynamic fluidic systems.

In one embodiment, the system 10 is used as an extractor of high diffusion coefficient molecules from a sample fluid. In another embodiment, the system 10 is used as a molecular loader to deliver small molecules to cells/proteins. In another embodiment, the system 10 is used as bioaccelerator.

The system 10 is a magnetohydrodynamic fluidic system including a reagent source containing a reagent fluid, a sample source containing a sample fluid that includes a constituent, a microchannel reactor operatively connected to the reagent source and the sample source, and MHD pumps for moving the reagent fluid and the sample fluid that includes a constituent from the reservoirs to the microchannel reactor such that the sample fluid that includes a constituent flows at an interface between the reagent fluids causing the constituent to be separated from the sample fluid. The MHD pump utilizes a magnetohydrodynamic drive for moving the fluid and the sample fluid in a flow such that the reagent fluid and the sample fluid form an interface causing the constituent to be separated from the sample fluid.

The system 10 includes a first sheath fluid reagent source 11. The first sheath fluid reagent source 11 contains a first sheath fluid that has a first set of attributes. A second sheath fluid reagent source 12 contains a second sheath fluid that has a second set of attributes. A sample source 13 contains a sample fluid that includes at least one constituent of interest. The first sheath fluid reagent source 11, second sheath fluid reagent source 12, and sample source 13 merge into a reactor microchannel 17. The reactor microchannel 17 then splits into a first receiving unit 14, a second receiving unit 15, and a waste or reprocessing unit 16. A magnetohydrodynamic pump system 18A, 18B, 18C, 18D, 18E, and 18F moves the first sheath fluid, the second sheath fluid, and the sample fluid into the reactor microchannel 17 in a layered flow such that the sample fluid flows between the first sheath fluid and the second sheath fluid causing the constituent of interest to be separated from the sample fluid.

The reactor microchannel 17 causes the constituent of interest to be separated from the sample fluid. When the sample fluid is pumped through the reactor microchannel 17 the sample fluid is sandwiched by sheath flow from the first sheath fluid reagent source 11 and the second sheath fluid reagent source 12. As a result, the faster diffusing small molecules will be extracted to first and second sheath flows in the reactor microchannel 17 and delivered to the first receiving unit 14 and second receiving unit 15. The rest of the sample can be delivered to the waste or reprocessing unit 16 or to other sections for further processing. Tuning the relative amplitudes of the MHD pumps 18A, 18B, 18C, 18D, 18E, and 18F modifies the pressure ratios to adjust the diffusion lengths. This in turn sets the diffusion threshold of extraction to determine what size molecules to extract. One example of use of the system 10 is to extract proteins and nucleic acids from body fluids (such as saliva) leaving back larger constituents such as bacteria and other large cells. The reactor can be a system similar to the H-Filter® platform available from Micronics, Inc., 8463 154th Avenue NE, Building F, Redmond, Wash. 98052. The H-Filter® platform has two input flows and two outputs. The current invention can multiplex many platforms onto one chip to analyze numerous samples at one time. Diffusion can be used to filter unwanted components or to extract desired components from one of several fluids being simultaneously processed. Diffusion along the horizontal section serves as an extractor—pulling certain elements out of the sample and into the diluent.

The MHD pumps 18A, 18B, 18C, 18D, 18E, and 18F move the first sheath fluid, the second sheath fluid, and the sample fluid into the reactor microchannel 17 in a layered flow such that the sample fluid flows between the first sheath fluid and the second sheath fluid causing the constituent of interest to be separated from the sample fluid. MHD pumps include electrode pairs in the presence of a magnetic field and use the Lorentz force to propel an electrolytic solution along a microchannel. The pumping mechanism for a MHD pump results from the Lorentz force. This force is produced when an electric current is applied across a channel filled with conducting solution in the presence of a perpendicular magnetic field. The Lorentz force is both perpendicular to the current in the channel and the magnetic field, and is given by the equation:

$$F=I \times Bw$$

where I is electric current across the channel (measured in amperes), B is the magnetic field (measured in Tesla) and w is the distance between the electrodes. In the microscale, the MHD forces are substantial and can be used for propulsion of fluids through microchannels.

In the system 10, the reagent source includes a first reagent source containing a first sheath fluid and a second reagent source containing a second sheath fluid. MHD pumps moves the first sheath fluid, the second sheath fluid, and the sample fluid into the reactor microchannel in a layered flow such that the sample fluid flows between the first sheath fluid and the second sheath fluid causing the constituent to be separated from the sample fluid.

Figure 2:
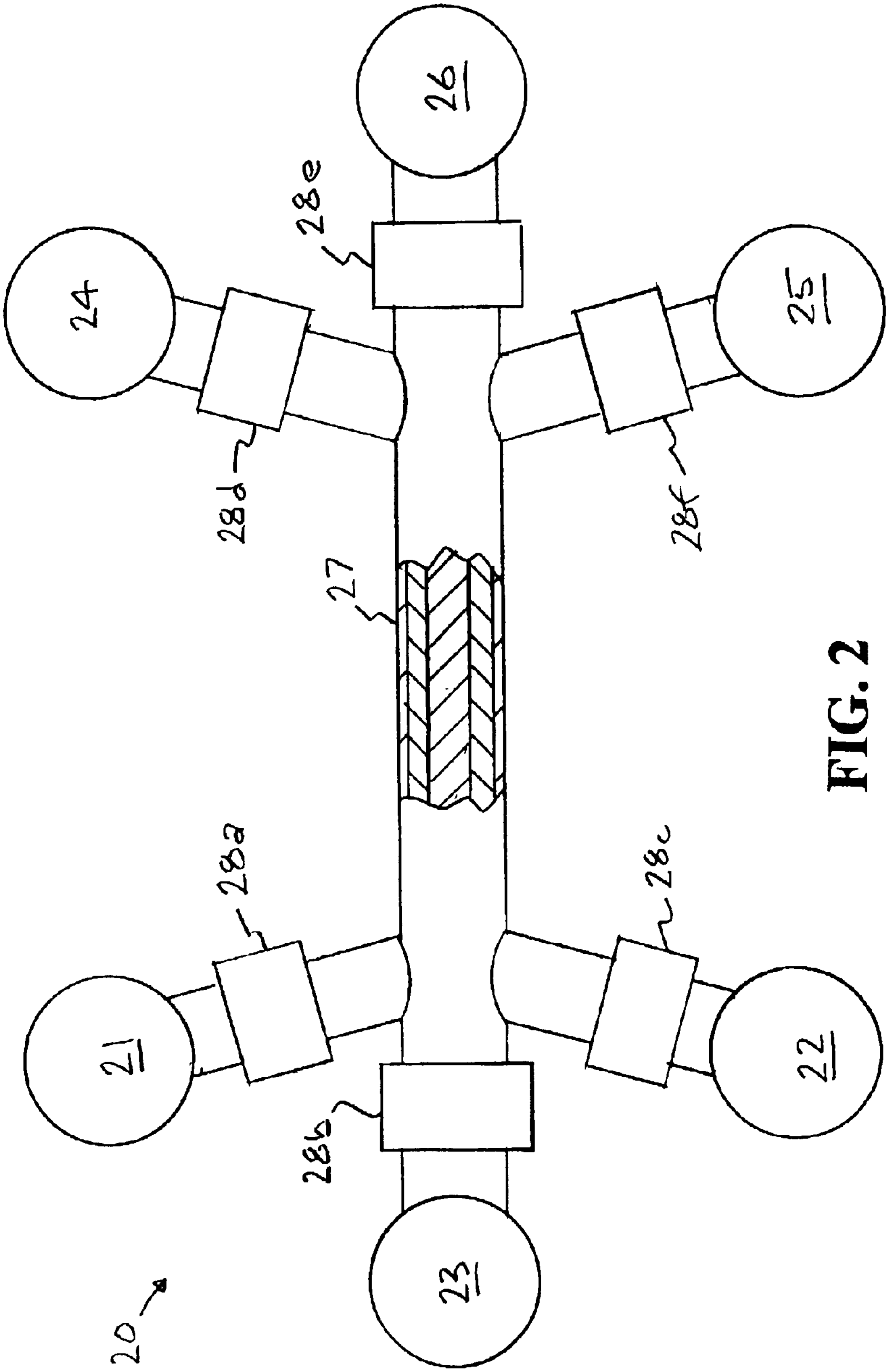
FIG. 2 illustrates a magnetohydrodynamic diffusion extractor system.

Referring now to FIG. 2, a magnetohydrodynamic diffusion extractor system is illustrated. The system is designated generally by the reference numeral 20. The diffusion extractor system 20 is an extractor of high diffusion coefficient molecules. The diffusion extractor system includes an extraction section that extracts the faster diffusing small molecules to the sheath fluids. The sample fluid consists of a mixture of large and small molecules and the diffusion extractor system extracts the faster diffusing small molecules from the sample fluid. MHD pumps adjust the diffusion of the diffusion extractor system by modifying pressure ratios.

The system 20 includes a first sheath reservoir 21. The first sheath reservoir 21 contains a first sheath fluid. A second sheath reservoir 22 contains a second sheath fluid. A sample reservoir 23 contains a sample fluid consisting of a mixture of large and small molecules. The first sheath reservoir 21, the second sheath reservoir 22, and the sample reservoir 23 all merge into an extraction microchannel section 27. This extraction microchannel section 27 then splits into a first extraction reservoir 24, a second extraction reservoir 25, and a waste or other sections unit 26.

In operation of the magnetohydrodynamic diffusion extractor system 20, a sample consisting of a mixture of large and small molecules is stored in the sample reservoir 23. When pumped through the extraction microchannel section 27, the sample is sandwiched by sheath flow from the sheath reservoirs 22 and 23. As a result, the faster diffusing small molecules will be extracted to the sheath flows in the extraction microchannel section 27 and delivered to the extraction reservoirs 24 and 25. The remaining sample can be delivered to the waste or other sections 26 for disposal or further processing.

Magnetohydrodynamic pump system 28A, 28B, 28C, 28D, 28E, and 28F move the first sheath fluid, the second sheath fluid, and the sample fluid through the extraction microchannel section 27 in a layered flow such that the sample fluid flows between the first sheath fluid and the second sheath fluid causing the faster diffusing small molecules to be extracted by the sheath flow in the extraction microchannel section 27. The faster diffusing small molecules are delivered to the first extraction reservoir 24 and the second extraction reservoir 25. The MHD pumps 28A, 28B, 28C, 28D, 28E, and 28F can adjust the diffusion lengths by modifying the pressure ratios. This in turn sets the diffusion threshold of extraction to determine what size molecules to extract. One possible application is to extract proteins and nucleic acids from body fluids (such as saliva) leaving back larger constituents such as bacteria and other large cells.

Figure 3:
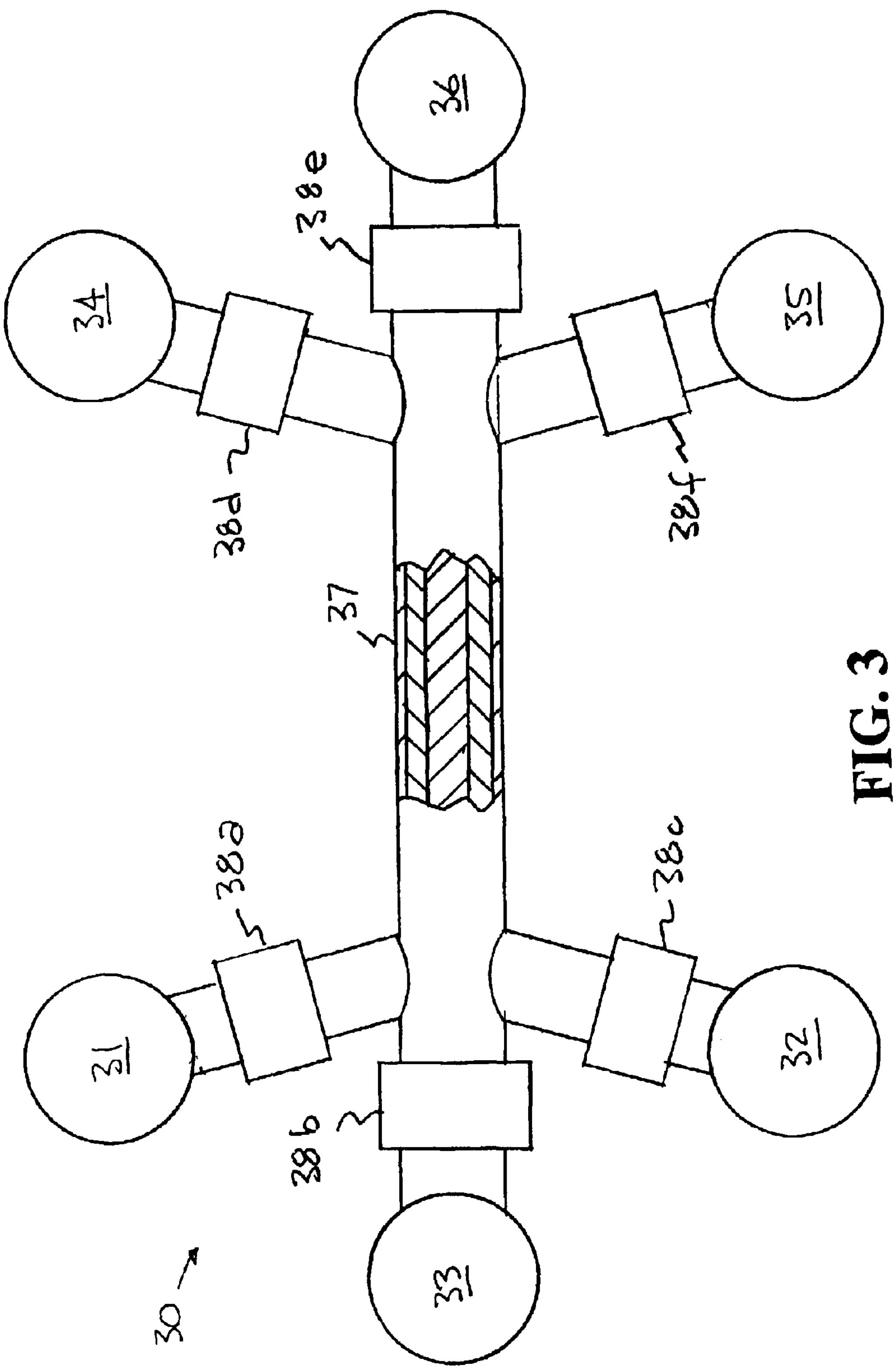
FIG. 3 illustrates a magnetohydrodynamic a molecular loader system.

Referring now to FIG. 3, a magnetohydrodynamic a molecular loader system is illustrated. The system is designated generally by the reference numeral 30. The molecular loader system 30 delivers small molecules to host cells or proteins. The molecular loader system loads host cells or proteins with small molecules or nucleic acids. The first reagent source is a first sheath delivery reservoir containing the first sheath fluid, the second reagent source is a second sheath delivery reservoir containing the second sheath fluid, and the sample fluid consists of a host fluid of host cells and molecules. The host fluid is sandwiched by sheath flow of the first sheath fluid and the second sheath fluid. A product reservoir operatively collects the loaded host molecules as a result of the small molecules from the sheath fluid diffusing into the host molecules from the host reservoir. MHD pumps adjust the rate the small molecules will diffuse into the host cells and molecules and be delivered to the product reservoir by modifying pressure ratios.

The system 30 can be used to deliver small molecules to cells/proteins. The system 30 includes a first sheath delivery reservoir 31. The first sheath delivery reservoir 31 contains a first sheath fluid. A second sheath delivery reservoir 32 contains a second sheath fluid. A host reservoir 33 contains a host fluid consisting of host cells and molecules. The first sheath delivery reservoir 31, the second sheath delivery reservoir 32, and the host reservoir 33 all merge into a loading microchannel section 37. This loading microchannel section 37 then splits into a first waste reservoir 34, a second waste reservoir 35, and a product reservoir 26.

In the loading mode, a sample consisting of host cells and molecules is stored in the host reservoir 33. When pumped through the loading section 37 the host fluid is sandwiched by sheath flow (with the delivery molecules) from the sheath delivery reservoirs 31 and 32. As a result, the fast diffusing small delivery molecules will diffuse to the host stream in the loading microchannel section 37 and be delivered to the product reservoir 36. The rest of the sheath delivery fluid can be delivered to the waste or to other sections 34 and 35 for further processing. The MHD pumps 38A. 38B, 38C, 38D, 38E, and 38F can adjust the diffusion lengths by modifying the pressure ratios. This in turn sets the diffusion threshold of what size molecules to load into the host fluid. One possible application is to load cells or proteins with small molecules or nucleic acids.

Figure 4:
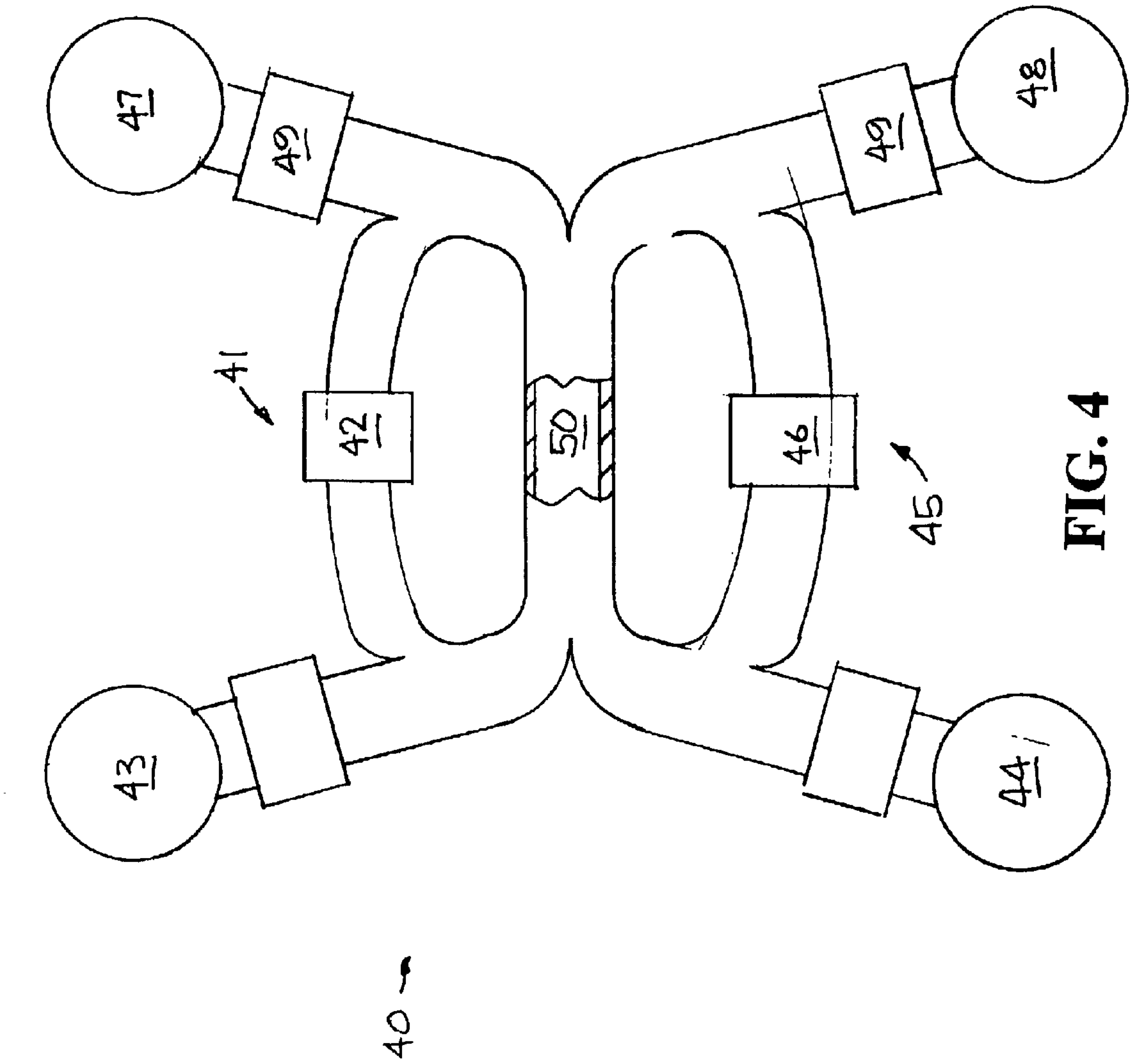
FIG. 4 illustrates a magnetohydrodynamic a bioaccelerator reactor system.

Referring now to FIG. 4, a magnetohydrodynamic bioaccelerator reactor system is illustrated. The system is designated generally by the reference numeral 40. The reactor 40 includes a first loop and a second loop and the interface occurs between the first loop and the second loop. MHD pumps adjust the rate the sample fluid that includes a constituent flows at the interface. The MHD pumps include a MHD pump in the first loop and a MHD pump in the second loop.

As the sample is delivered from the sample reservoir 43 to the upper loop 41, it is accelerated by the sample MHD accelerator 42. Similarly, the reagent is delivered from the reagent reservoir 44 to the lower loop 45 and accelerated by the reagent MHD accelerator 46. The upper loop 41 and lower loop 45 are prevented from exiting to the collection chamber 47 or the waste chamber 48 by counter pressures generated by restrictor MHD pumps 49. The sample and reagent merge only at the fluid interface 50 with a predetermined reaction length. This will prevent diffusion from dominating over the reaction taking place. As soon as the desired reaction time is reached or a product is detected, the restrictor MHD pumps 49 are reversed to collect the product into the collection chamber 47 and the used reagents into the waste chamber 48.

Figure 5:
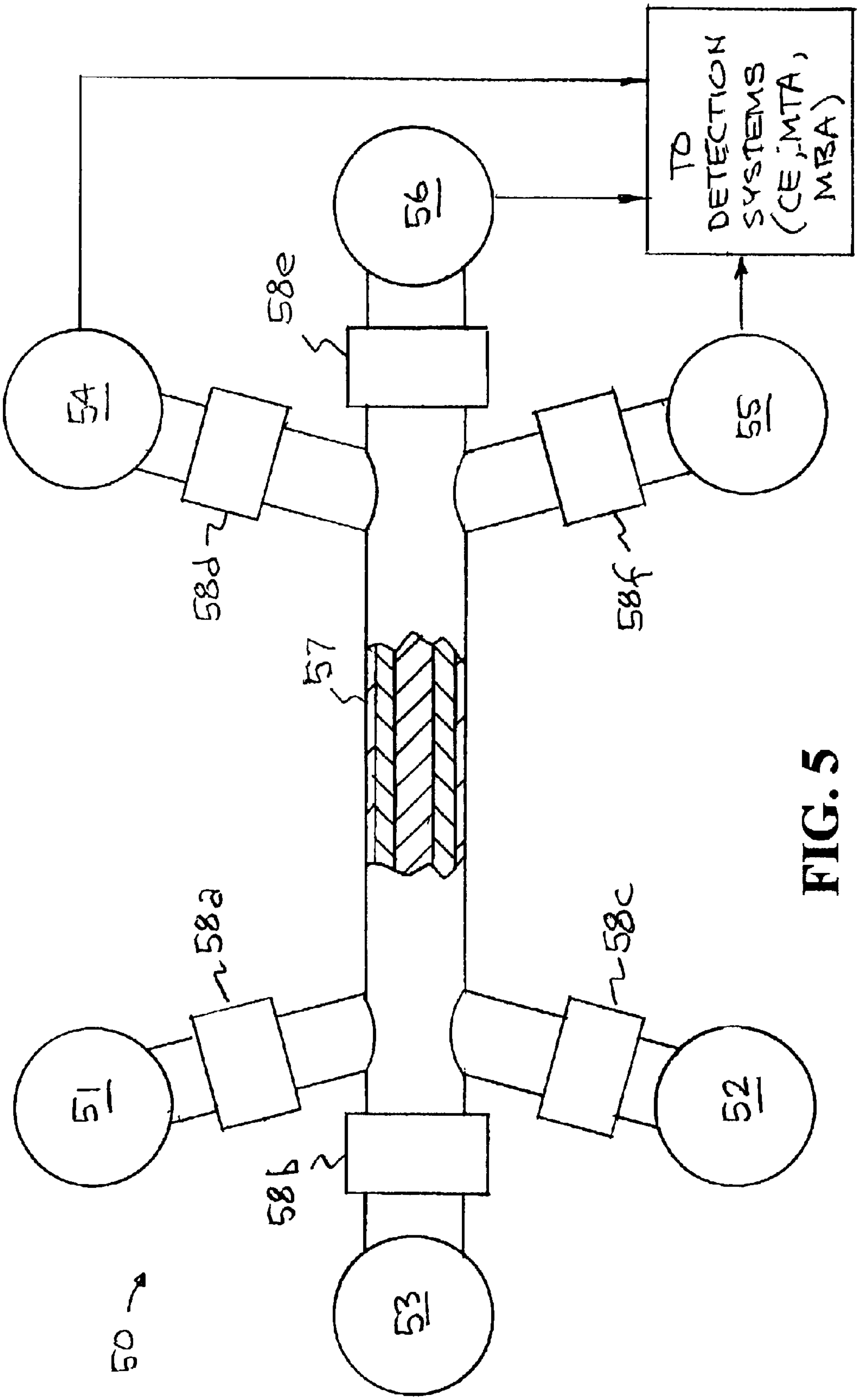
FIG. 5 illustrates a system for separating bacteria from salivary proteins, ions, etc., in whole saliva.

Referring now to FIG. 5, a system for separating bacteria from salivary proteins, ions, etc., in whole saliva is illustrated. The system is designated generally by the reference numeral 50. In the system 50 the first sheath fluid and the second sheath fluid are saline buffer solutions and the sample fluid is whole saliva. One constituent in the whole saliva sample fluid is bacteria. The bacteria constituent is separated from the whole saliva sample fluid and delivered to a bacteria reservoir. Detection systems are operatively connected to the bacteria reservoir and the bacteria is delivered to the detection systems. One constituent in the whole saliva sample fluid is salivary proteins, ions, etc. The salivary proteins, ions, etc., constituent are separated from the whole saliva sample fluid and delivered to salivary proteins, ions, etc., reservoir. Detection systems are operatively connected to the salivary proteins, ions, etc., reservoir and the salivary proteins, ions, etc., are delivered to the detection systems.

The system 50 includes a saline buffer reservoir 51. The saline buffer reservoir 51 contains a saline buffer fluid. A second saline buffer reservoir 52 contains a second saline buffer fluid. A whole saliva reservoir 53 contains a whole saliva fluid consisting of a mixture of large and small molecules. The saline buffer reservoir 51, the second saline buffer reservoir 52, and the whole saliva reservoir 53 all merge into an extraction microchannel section 57. This extraction microchannel section 57 then splits into a first salivary proteins, ions, etc., reservoir 54, a second salivary proteins, ions, etc., reservoir 55, and a bacteria unit 56.

In operation of the system 50, whole saliva consisting of a mixture of bacteria and salivary proteins, ions, etc., is stored in the whole saliva reservoir 53. When pumped through the extraction section 57, the whole saliva is sandwiched by sheath flow from the sheath reservoirs 51 and 52. As a result, the faster diffusing small molecules will be extracted to the sheath flow in the extraction microchannel section 57 and delivered to the salivary proteins, ions, etc., reservoirs 54 and 55. The bacteria from the whole saliva remains in the sample stream and is delivered to the bacteria reservoir 56 for further processing. The salivary proteins, ions, etc., from reservoirs 54 and 55 and the bacteria from reservoir 56 can be delivered to detection systems (e.g., PCR, capillary electrophoresis).

Magnetohydrodynamic pump system 58A, 58B, 58C, 58D, 58E, and 58F move the saline buffer fluid, the second saline buffer fluid, and the whole saliva fluid through the extraction microchannel section 57 in a layered flow such that the whole saliva fluid flows between the saline buffer fluid and the second saline buffer fluid causing the diffusing molecules to be extracted by the sheath flow in the extraction microchannel section 57. The salivary proteins, ions, etc., molecules are delivered to the salivary proteins, ions, etc., reservoirs 54 and 55. The bacteria molecules are delivered to the bacteria reservoir 56. The MHD pumps 58A, 58B, 58C, 58D, 58E, and 58F can adjust the diffusion lengths by modifying the pressure ratios. This in turn sets the diffusion threshold of extraction to determine what size molecules to extract.

The present invention provides magnetohydrodynamic fluidic system that includes providing a fluid, providing a sample fluid containing a constituent, and using a magnetohydrodynamic drive for moving the fluid and the sample fluid in a flow such that the fluid and the sample fluid form an interface causing the constituent to be separated from the sample fluid. In one embodiment, the step of providing a fluid includes providing a first sheath fluid and providing a second sheath fluid, and wherein the step of using a magnetohydrodynamic drive for moving the fluid and the sample fluid moves the first sheath fluid, the second sheath fluid, and the sample fluid in a layered flow such that the sample fluid flows between the first sheath fluid and the second sheath fluid causing the constituent to be separated from the sample fluid. The sample fluid consists of a mixture of large and small molecules and the step of using a magnetohydrodynamic drive for moving the fluid extracts the small molecules from the large molecules. In another embodiment a first loop and a second loop are utilized to form the interface between the fluid and the sample fluid causing the constituent to be separated from the sample fluid.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A magnetohydrodynamic fluidic system, comprising:

a reagent source containing a reagent fluid, said reagent source including a first reagent source containing a first sheath fluid and a second reagent source containing a second sheath fluid, a sample source containing a sample fluid that includes a constituent, a microchannel reactor operatively connected to said reagent source and said sample source, and MHD pumps for moving said reagent fluid and said sample fluid that includes a constituent in said reactor such that said sample fluid that includes a constituent flows at an interface between said reagent fluid and said sample fluid causing said constituent to be separated from said sample fluid and wherein said system is configured such that said MHD pumps move said first sheath fluid, said second sheath fluid, and said sample fluid in said microchannel reactor in a layered flow and such that said sample fluid flows between said first sheath fluid and said second sheath fluid causing said constituent to be separated from said sample fluid.

2. The magnetohydrodynamic fluidic system of claim 1, wherein said microchannel reactor is a diffusion extractor system.

3. The magnetohydrodynamic fluidic system of claim 2, wherein said diffusion extractor system is an extractor of high diffusion coefficient molecules.

4. The magnetohydrodynamic fluidic system of claim 2, wherein said sample fluid contains faster diffusing small molecules and wherein said diffusion extractor system includes an extraction section that extracts the faster diffusing small molecules to said sheath fluids.

5. The magnetohydrodynamic fluidic system of claim 2, wherein said sample fluid consists of a mixture of large molecules and faster diffusing small molecules and wherein said diffusion extractor system extracts the faster diffusing small molecules from the large molecules.

6. The magnetohydrodynamic fluidic system of claim 5, wherein said MHD pumps adjust the diffusion of said diffusion extractor system.

7. The magnetohydrodynamic fluidic system of claim 6, wherein said MHD pumps adjust the diffusion of said diffusion extractor system by modifying pressure ratios.

8. The magnetohydrodynamic fluidic system of claim 1, wherein said microchannel reactor is a molecular loader system.

9. The magnetohydrodynamic fluidic system of claim 8, wherein said molecular loader system delivers small molecules to cells or proteins.

10. The magnetohydrodynamic fluidic system of claim 9, wherein said molecular loader system loads cells or proteins with small molecules or nucleic acids.

11. The magnetohydrodynamic fluidic system of claim 8, wherein said sample fluid consists of a host fluid of host molecules.

12. The magnetohydrodynamic fluidic system of claim 8, wherein said first reagent source is a first sheath delivery reservoir containing said first sheath fluid, said second reagent source is a second sheath delivery reservoir containing said second sheath fluid, and said sample fluid consists of a host fluid of host molecules.

13. The magnetohydrodynamic fluidic system of claim 12, wherein said host fluid is sandwiched by sheath flow of said first sheath fluid and said second sheath fluid.

14. The magnetohydrodynamic fluidic system of claim 13 including a product reservoir operatively connected to said microchannel reactor and wherein certain of said host molecules will diffuse and be delivered to said product reservoir.

15. The magnetohydrodynamic fluidic system of claim 14, wherein said MHD pumps control the rate said host molecules will diffuse and be delivered to said product stream and then into said product reservoir.

16. The magnetohydrodynamic fluidic system of claim 15, wherein said MHD pumps control the rate said host molecules will diffuse and be delivered to said product reservoir by modifying pressure ratios.

17. The magnetohydrodynamic fluidic system of claim 1, wherein said microchannel reactor includes a first loop and a second loop and said interface occurs between said first loop and said second loop.

18. The magnetohydrodynamic fluidic system of claim 17, wherein said MHD pumps control the rate said sample fluid that includes a constituent flows at said interface.

19. The magnetohydrodynamic fluidic system of claim 18, wherein said MHD pumps include a MHD pump in said first loop and a MHD pump in said second loop.

20. The magnetohydrodynamic fluidic system of claim 1, wherein said first sheath fluid and said second sheath fluid are saline buffer solutions and said sample fluid is whole saliva.

21. The magnetohydrodynamic fluidic system of claim 20, wherein said constituent in said whole saliva sample fluid is bacteria.

22. The magnetohydrodynamic fluidic system of claim 21, wherein said bacteria constituent is separated from said whole saliva sample fluid and delivered to a bacteria reservoir.

23. The magnetohydrodynamic fluidic system of claim 22 including detection systems operatively connected to said bacteria reservoir and wherein said bacteria is delivered to said detection systems.

24. The magnetohydrodynamic fluidic system of claim 20, wherein said constituent in said whole saliva sample fluid comprises salivary proteins and ions.

25. The magnetohydrodynamic fluidic system of claim 24, wherein said constituent is separated from said whole saliva sample fluid and delivered to a reservoir.

26. The magnetohydrodynamic fluidic system of claim 25 including detection systems operatively connected to said reservoir and wherein said sample fluid is delivered to said detection systems.

27. A magnetohydrodynamic fluidic method, comprising the steps of:

providing a fluid, said step of providing a fluid including providing a first sheath fluid and providing a second sheath fluid, providing a sample fluid containing a constituent, and using a magnetohydrodynamic drive for moving said fluid and said sample fluid in a flow such that said fluid and said sample fluid form an interface causing said constituent to be separated from said sample fluid and wherein said step of using a magnetohydrodynamic drive for moving said fluid and said sample fluid moves said first sheath fluid, said second sheath fluid, and said sample fluid in a layered flow such that said sample fluid flows between said first sheath fluid and said second sheath fluid causing said constituent to be separated from said sample fluid.

28. The magnetohydrodynamic fluidic method of claim 27, wherein said sample fluid consists of a mixture of large and small molecules and said step of using a magnetohydrodynamic drive for moving said fluid separates said small molecules from said large molecules.

29. The magnetohydrodynamic fluidic method of claim 28, including the step of delivering said small molecules to cells or proteins.

30. The magnetohydrodynamic fluidic method of claim 29, including the step of loading cells or proteins with said small molecules.

31. The magnetohydrodynamic fluidic method of claim 27, wherein said first sheath fluid and said second sheath fluid are saline buffer solutions and said sample fluid is whole saliva.

32. The magnetohydrodynamic fluidic method of claim 31, wherein said constituent in said whole saliva sample fluid is bacteria.

33. The magnetohydrodynamic fluidic method of claim 32, wherein said bacteria constituent is separated from said whole saliva sample fluid and delivered to a bacteria reservoir.

34. The magnetohydrodynamic fluidic method of claim 33 including the step of using detection systems to analyze said bacteria.

35. The magnetohydrodynamic fluidic method of claim 33 including the step of using detection systems to analyze said constituent.

36. The magnetohydrodynamic fluidic method of claim 32, wherein said constituent is separated from said whole saliva sample fluid and delivered to a reservoir.

37. The magnetohydrodynamic fluidic method of claim 31, wherein said constituent in said whole saliva sample fluid comprises salivary proteins and ions.

38. The magnetohydrodynamic fluidic method of claim 27, wherein said step of using a magnetohydrodynamic drive for moving said fluid includes modifying pressure ratios.

39. The magnetohydrodynamic fluidic method of claim 27, wherein a first loop and a second loop are utilized to form said interface between said fluid and said sample fluid causing said constituent to be separated from said sample fluid.

40. The magnetohydrodynamic fluidic method of claim 39, adjusting the rate said sample fluid flows at said interface.

41. The magnetohydrodynamic fluidic method of claim 39, adjusting the rate said fluid flows at said interface.

42. The magnetohydrodynamic fluidic method of claim 39, adjusting the rates said fluid and said sample fluid flow at said interface.

* * * * *